United States Patent
Ito et al.

(10) Patent No.: US 11,148,515 B2
(45) Date of Patent: Oct. 19, 2021

(54) DRIVING DEVICE FOR ELECTRIC TRUCK

(71) Applicant: Daimler AG, Stuttgart (DE)

(72) Inventors: Maki Ito, Kawasaki (JP); Hiroshi Matsumoto, Kawasaki (JP)

(73) Assignee: Daimler AG, Stuttgart (DE)

( * ) Notice: Subject to any disclaimer, the term of this patent is extended or adjusted under 35 U.S.C. 154(b) by 124 days.

(21) Appl. No.: 16/634,528

(22) PCT Filed: Jul. 20, 2018

(86) PCT No.: PCT/JP2018/027317
§ 371 (c)(1),
(2) Date: Apr. 24, 2020

(87) PCT Pub. No.: WO2019/021965
PCT Pub. Date: Jan. 31, 2019

(65) Prior Publication Data
US 2020/0247224 A1 Aug. 6, 2020

(30) Foreign Application Priority Data

Jul. 28, 2017 (JP) .............................. JP2017-146919

(51) Int. Cl.
*B60K 1/00* (2006.01)
*B60B 35/12* (2006.01)
(Continued)

(52) U.S. Cl.
CPC .............. *B60K 1/00* (2013.01); *B60B 35/124* (2013.01); *B60B 35/16* (2013.01); *B60G 11/02* (2013.01);
(Continued)

(58) Field of Classification Search
CPC ........ B62D 21/03; B60K 17/165; B60K 1/04; B60G 11/02; B60B 35/16; B60B 35/124
See application file for complete search history.

(56) References Cited

U.S. PATENT DOCUMENTS 9,862,425 B2 * 1/2018 Suzuki ................. B62D 23/005
10,112,451 B2 * 10/2018 Mikesell ................. B60D 1/06
(Continued)

FOREIGN PATENT DOCUMENTS

| JP | 60-89035 U | 6/1985 |
| JP | 6-61856 U | 8/1994 |

(Continued)

OTHER PUBLICATIONS

PCT/JP2018/027317, International Search Report dated Oct. 16, 2018, with English translation (Three (3) pages).

*Primary Examiner* — James A Shriver, II
*Assistant Examiner* — James J Triggs
(74) *Attorney, Agent, or Firm* — Crowell & Moring LLP

(57) ABSTRACT

A driving device for an electric truck which can obtain good ride quality by decreasing the unsprung weight while achieving the adequate fuel efficiency performance by improving the power transmission efficiency and which can improve the mountability of a battery. The driving device includes a driving unit that accommodates therein a motor, a gearbox, and a differential device. The driving unit is supported by a first support part with respect to a ladder frame. Drive shafts coupled to the differential device are accommodated in hollow members. The hollow members are elastically supported by a second support part with respect to the ladder frame.

4 Claims, 4 Drawing Sheets

(51) Int. Cl.
  *B60B 35/16*     (2006.01)
  *B60G 11/02*     (2006.01)
  *B60K 17/16*     (2006.01)
  *B62D 21/03*     (2006.01)
  *B60K 6/36*      (2007.10)
  *B60K 6/40*      (2007.10)

(52) U.S. Cl.
  CPC ............ *B60K 17/165* (2013.01); *B62D 21/03* (2013.01); *B60K 6/36* (2013.01); *B60K 6/40* (2013.01); *B60Y 2200/14* (2013.01); *B60Y 2200/91* (2013.01); *B60Y 2200/92* (2013.01)

(56)           References Cited

U.S. PATENT DOCUMENTS

| 10,532,772 | B2* | 1/2020 | Upah ................... B62D 23/005 |
| 10,640,151 | B2* | 5/2020 | Hisamura ............ B60G 13/003 |
| 10,967,694 | B2* | 4/2021 | Brady ................... B60G 3/202 |
| 11,014,419 | B2* | 5/2021 | Danielson ............... B60K 11/04 |
| 2005/0110263 | A1* | 5/2005 | Rini ....................... B62D 21/02 280/781 |
| 2015/0197130 | A1* | 7/2015 | Smith ................ B60G 17/0155 280/124.175 |
| 2016/0347137 | A1* | 12/2016 | Despres-Nadeau ...... B60G 3/14 |

FOREIGN PATENT DOCUMENTS

| JP | 2001-1774 A | 1/2001 |
| JP | 2012-111369 A | 6/2012 |

\* cited by examiner

[Fig. 1]
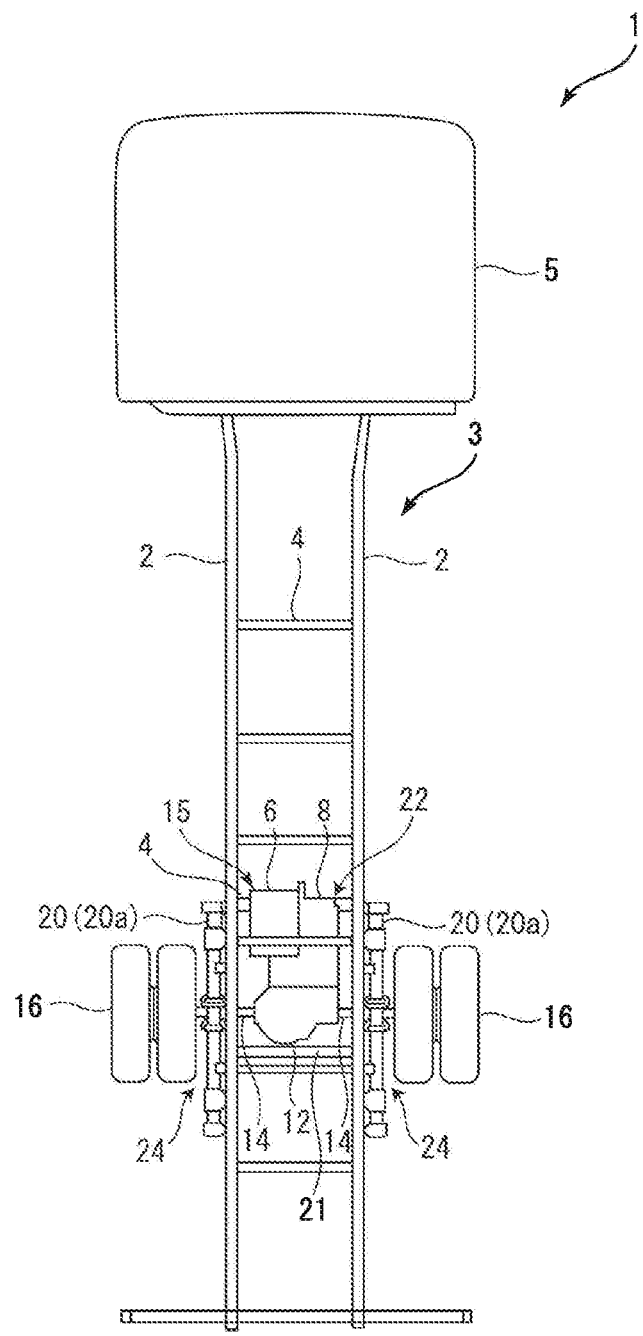

[Fig. 2]
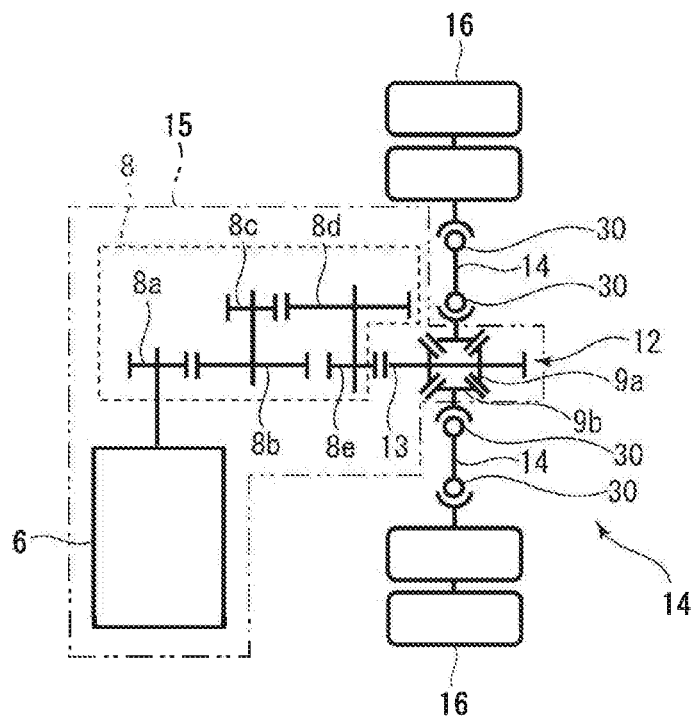
[Fig. 3]
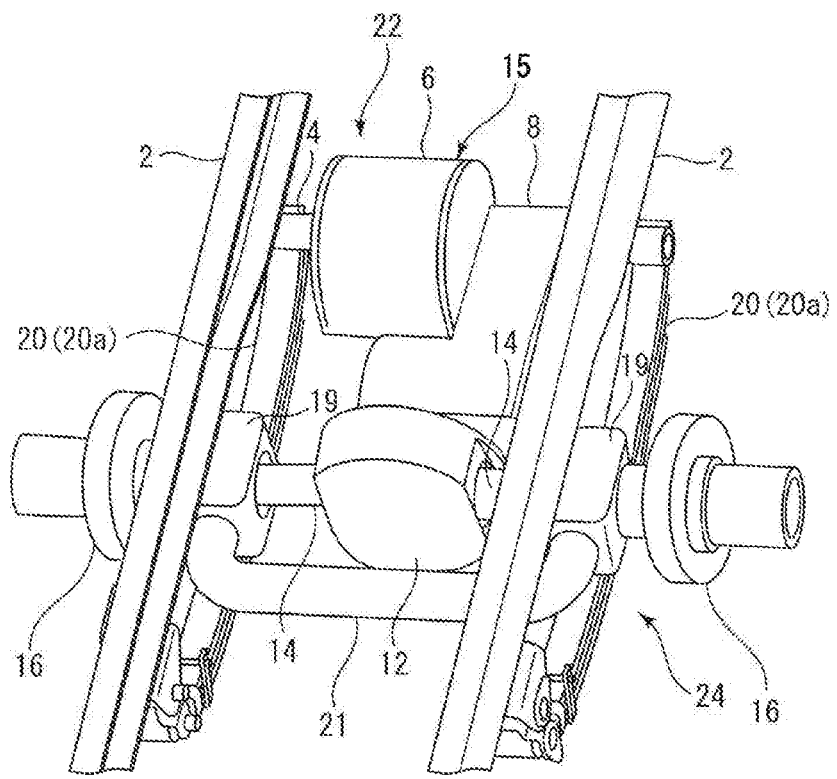

[Fig. 4]
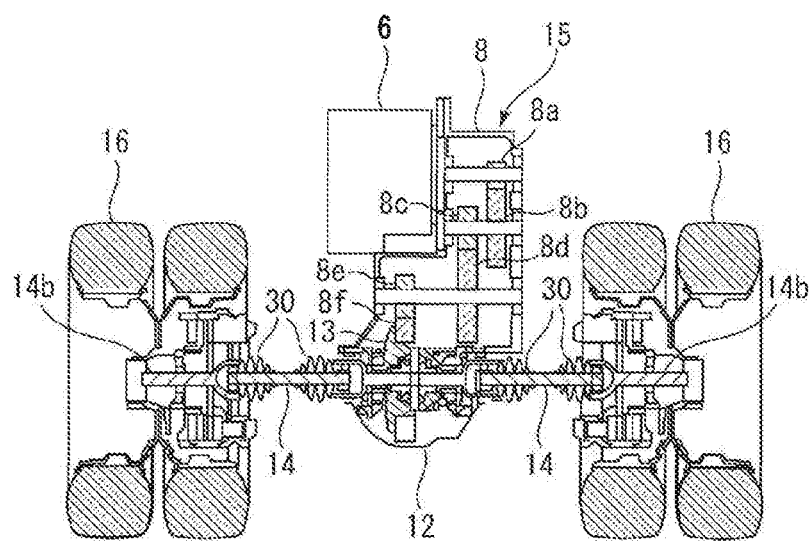

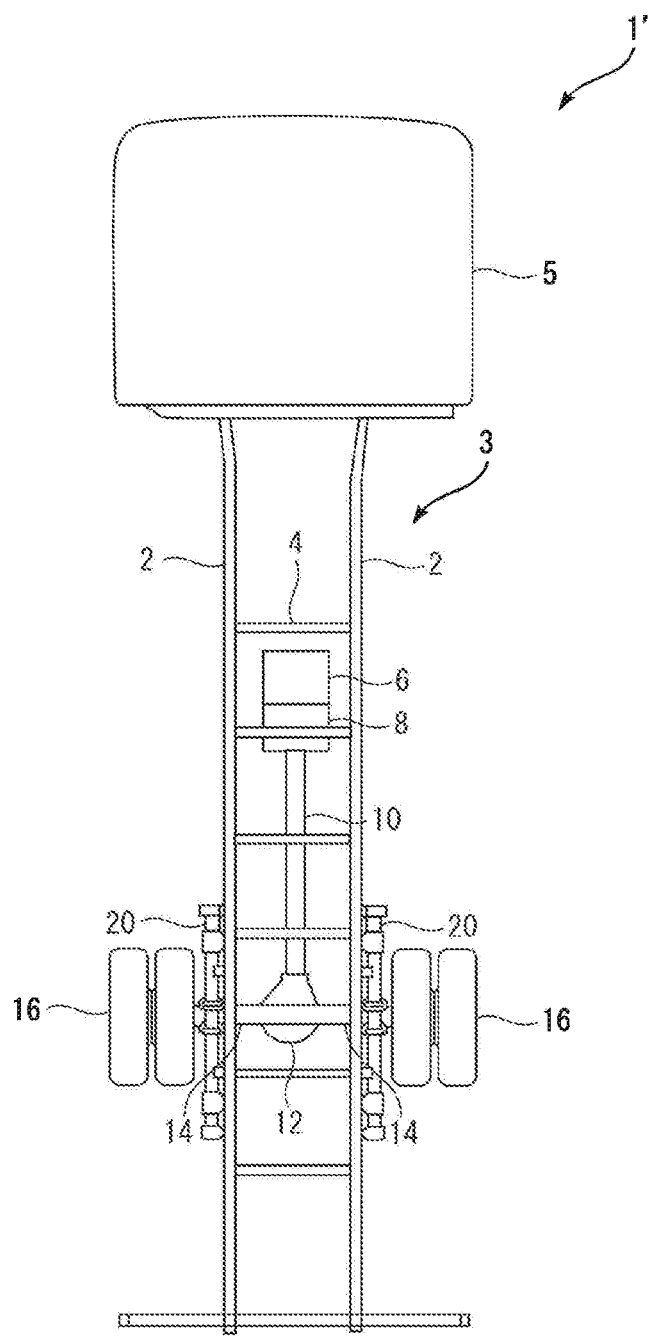
[Fig. 5]

DRIVING DEVICE FOR ELECTRIC TRUCK

FIELD OF THE INVENTION

The present disclosure relates to a driving device for an electric truck that is capable of traveling by transferring a driving force of a motor to wheels.

BACKGROUND OF THE INVENTION

Electric vehicles are known to be capable of traveling by transferring a driving force output from a motor driven with electric power (electric motor) to wheels. An electric vehicle using only a motor as a power source and a hybrid electric vehicle using a motor and an engine in combination are known as this type of electric vehicle. Such electric vehicles have come into widespread use mainly for passenger vehicles. In recent years, even for commercial vehicles, including trucks, the use of electric vehicles has also become widespread.

For example, Patent Document 1 discloses a hybrid type truck vehicle that includes an engine and a motor as a traveling power source.

[Patent Document 1] Japanese Unexamined Patent Application Publication No. 2012-111369

SUMMARY OF THE INVENTION

Electric vehicles have come into widespread use mainly for passenger vehicles, but in recent years, even for commercial vehicles, including trucks, development and research of electric vehicles have also been proceeding. Here, referring to FIG. 5, a description will be given on the schematic structure of a truck vehicle (electric truck) 1' including a motor as a traveling power source. FIG. 5 is an exemplary diagram showing the schematic structure of a typical electric truck 1' from an upper side thereof.

In the electric truck 1', a cab 5 and a cargo box (not shown) are mounted on a ladder frame 3. The ladder frame 3 includes a pair of right and left side rails 2 extending in the vehicle front-back direction and a plurality of cross members 4 disposed between the side rails 2. The pair of side rails 2 is provided to have a predetermined distance therebetween in the vehicle width direction. Each cross member 4 extends in the vehicle width direction and has both ends connected to the respective side rails 2. The plurality of cross members 4 is provided to have a predetermined distance therebetween in the vehicle front-back direction.

On such a ladder frame 3, a motor 6 as a power source, a gearbox 8, a propeller shaft 10, a differential device 12, and drive shafts 14 are provided. The gearbox 8 is coupled to the motor 6. The propeller shaft 10 is coupled to the gearbox 8. The differential device 12 is coupled to the propeller shaft 10. The drive shafts 14 are coupled to the differential device 12. An output from the motor 6 is decelerated by the gearbox 8 and then transferred to the differential device 12 via the propeller shaft 10. The differential device 12 transfers the power, transferred from the propeller shaft 10, to right and left wheels 16 at a predetermined ratio via the drive shafts 14, which achieves the travel of the electric truck 1'. Note that the pair of right and left drive shafts 14 is respectively suspended on the ladder frame 3 by right and left suspension devices 20.

In the electric truck 1' with such a structure, the output from the motor 6 is transferred to the sides of the wheels via the gearbox 8, the propeller shaft 10, and the differential device 12, which causes a loss of power to some extent, thus degrading the power transmission efficiency. In particular, the propeller shaft 10 includes a universal joint and is more likely to cause a loss of power. As a solving measure for reducing such a loss, for example, the use of a powertrain structure can be proposed to eliminate the propeller shaft 10, which would otherwise become a significant factor responsible for the loss. However, since in the structure that eliminates the propeller shaft 10, the motor 6 and the gearbox 8 are integrated into the differential device 12, the ride quality might be deteriorated due to an increase in the unsprung weight. Furthermore, the durability of parts in the electric trucks might be reduced because vibrations input from a road surface are more likely to be transferred to the motor 6 and the gearbox 8.

The electric truck is required to increase the capacity of a battery that stores electric power to be supplied to the motor 6 in order to enable ensuring a longer cruising distance. To meet such a requirement, it is necessary to enlarge a mounting space for the battery. In the frame structure shown in FIG. 5, the powertrain tends to become large in size due to the presence of the elongated propeller shaft 10, thereby making it difficult to ensure a sufficient setting space.

In addition, for the truck, its vehicle weight is heavier than that of a passenger vehicle and is further increased when loading cargoes. Thus, since an extremely significant input or load is applied to the suspension device, the weight of the suspension device must also increase in terms of ensuring the reliability. Consequently, the unsprung weight might increase, compared to that of the suspension device of the passenger vehicle.

At least one embodiment of the present invention has been made in view of the foregoing matter. Therefore, it is an object of at least one embodiment of the present invention to provide a driving device for an electric truck that can improve the mountability of a battery and prevent an increase in the unsprung weight, while achieving good fuel efficiency performance by improving the power transmission efficiency.

(1) To solve the above-mentioned problems, a driving device for an electric truck according to at least one embodiment of the present invention is a driving device for an electric truck that includes a ladder frame on which a cab is mounted, the ladder frame extending along a front-back direction of the electric truck, the driving device including: a driving unit that accommodates therein a motor serving as a power source, a gearbox coupled to the motor, and a differential device coupled to the gearbox; a pair of drive shafts coupled to the differential device of the driving unit via flexible joints, the pair of drive shafts being adapted to transfer power generated by the motor to wheels of the electric truck; a pair of hollow members for accommodating therein the pair of drive shafts; a coupling member for supporting the pair of wheels by coupling the pair of hollow members together; a first support part for supporting the driving unit with respect to the ladder frame; and a second support part for elastically supporting the hollow members with respect to the ladder frame.

With the above-mentioned configuration (1), the motor, the gearbox, and the differential device are integrally configured as the driving unit. Thus, the output from the motor is transferred to the differential device without involvement of any elongated member, such as a propeller shaft, thereby enabling the power transfer with little loss of power. Consequently, the power transmission efficiency is improved, and the adequate fuel efficiency performance can be obtained. The driving unit does not include any elongated member, such as a propeller shaft, so that the powertrain structure can be made compact. Thus, a space for mounting other components, such as a battery, can be efficiently ensured when mounting the components on the vehicle.

However, suppose that the driving unit in which the motor, the gearbox, and the differential device are integrally configured is adopted for the purpose of improving the mountability of the battery, while achieving the adequate fuel efficiency performance by improving the power transmission efficiency. In such a case, especially, in heavy vehicles, such as trucks, unlike passenger vehicles, it is necessary to transfer the power from the motor to the differential device via the gearbox in order to obtain the sufficient motor torque, which might lead to an increase in the weight of the driving unit itself, increasing the unsprung weight. Furthermore, when adopting a rigid axle in a housing of a heavy vehicle, such as a truck, the unsprung weight might be further increased.

In contrast, in the driving device for an electric truck according to the present invention, the differential device of the driving unit is coupled to the drive shafts via the flexible joints. Further, the driving device includes the hollow members for accommodating therein the drive shafts and the coupling member for coupling and supporting the pair of wheels by coupling the hollow members together. The driving device further includes the first support part for supporting the driving unit with respect to the ladder frame and the second support part for elastically supporting the hollow members with respect to the ladder frame.

With such a configuration, the driving unit including the motor, the gearbox, and the differential device is supported onto the ladder frame by the first support part, which enables the support above the spring. On the downstream side of the differential device, the drive shafts coupled to the wheels and the saddles as the pair of hollow members for accommodating therein the drive shafts are coupled to one another by the coupling member which is an axle pipe, thereby configuring the so-called de Dion rigid axle.

Thus, in the electric truck according to the present embodiment, an increase in the unsprung weight can be prevented even when adopting, in the electric truck, the driving unit in which the motor, the gearbox, and the differential device are integrally configured and which would otherwise lead to an increase in the unsprung weight.

In this way, the driving device for an electric truck can be provided which obtains the good ride quality by decreasing the unsprung weight while achieving the adequate fuel efficiency performance by improving the power transmission efficiency and which can improve the mountability of a battery. In particular, for electric trucks, it is necessary to surely protect loaded cargoes from vibrations during traveling, as compared with passenger vehicles. Thus, the present invention is applied to the electric truck, so that the unsprung weight can be effectively reduced, and the loaded cargoes can be protected from vibrations.

With such a configuration, a road surface input from h side of the wheel is reduced, thereby making it possible to improve the useful lifetime and reliability of the driving unit. Since the road surface input into the driving unit is reduced, the structure of the housing and the like in the driving unit can also be simplified to thereby achieve the reduction of its weight.

(2) In some embodiments with the above-mentioned configuration (1), the first support part may elastically support the driving unit.

With the above-mentioned configuration (2), the driving unit is also elastically supported by the first support part.

Thus, the reliability of the motor can be assured even when vibrations are input from the side of the ladder frame.

(3) In some embodiments with the above-mentioned configuration (1) or (2), the second support part elastically supports the hollow members with respect to the ladder frame via leaf springs.

With the above-mentioned configuration (3), the elastic support of the hollow members by the second support part with respect to the ladder frame is configured by using the leaf springs that configure the suspension device. In this way, the suspension device, which is an existing component of the truck vehicle, can be used to configure the second support part. Thus, the above-mentioned configuration can be achieved while preventing the complexity of the vehicle structure. In particular, with the above-mentioned configuration, the good ride quality can be obtained without increasing the unsprung weight.

(4) In some embodiments with any one of the above-mentioned configurations (1) to (3), the differential device includes a helical gear to engage with a last gear of the gearbox.

With the above-mentioned configuration (4), the differential device includes the helical gear that engages with the last gear of the gearbox, whereby the structure that couples the differential device directly to the gearbox can be achieved without using the propeller shaft as the elongated member.

According to at least one embodiment of the present invention, the driving device for an electric truck can be provided that improves the mountability of a battery and can prevent an increase in the unsprung weight, while achieving good fuel efficiency performance by improving the power transmission efficiency.

BRIEF DESCRIPTION OF THE DRAWINGS

FIG. 1 is an exemplary diagram showing a schematic structure of an electric truck as viewed from an upper side thereof according to at least one embodiment of the present invention.

FIG. 2 is an exemplary diagram simply showing a power transmission route, including a driving unit shown in FIG. 1.

FIG. 3 is a perspective view showing the vicinity of the driving unit shown in FIG. 1 as viewed from a rear side of the vehicle.

FIG. 4 is a planar cross-sectional view passing through drive shafts of the driving unit shown in FIG. 1.

FIG. 5 is an exemplary diagram showing a schematic structure of a typical electric truck.

DESCRIPTION OF THE EMBODIMENTS

Some embodiments of the present invention will be described below with reference to the accompanying drawings. Note that the dimension, material, shape, relative arrangements, and the like of components described in the embodiments or shown in the figures are not intended to limit the scope of the present invention thereto and are illustrative examples only.

For example, the expressions about the relative or absolute arrangements, including "in a direction", "along a direction", "parallel", "perpendicular", "center", "concentric", "coaxial", and the like, indicate not only such positions strictly, but also the conditions that are relatively displaced by the tolerance or with an angle or distance that achieves the same function.

Furthermore, for example, the expressions about the shape, including a quadrangular shape and a cylindrical shape, indicate not only the quadrangular and cylindrical shapes strictly in terms of geometry but also the shapes in which an uneven part, a chamfered part, and the like are included, as long as they exhibit the same effects.

Meanwhile, the expressions of "comprising", "including", "provided with", "containing", and "having" one component are not exclusive expressions that exclude the existence of other components.

FIG. 1 is a schematic diagram showing an outline of a structure of an electric truck 1 as viewed from an upper side thereof according to at least one embodiment of the present invention. FIG. 2 is a schematic diagram simply showing a power transmission route, including a driving unit 15 shown in FIG. 1. FIG. 3 is a perspective view showing the vicinity of the driving unit 15 shown in FIG. 1 as viewed from a rear side of the vehicle.

In the electric truck 1, a cab 5 and a cargo box (not shown) are mounted on a ladder frame 3. The ladder frame 3 includes a pair of right and left side rails 2 extending in the vehicle front-back direction and a plurality of cross members 4 disposed between the side rails 2. The pair of side rails 2 is provided to have a predetermined distance therebetween in the vehicle width direction. Each cross member 4 extends in the vehicle width direction and has both ends thereof connected to the respective side rails 2. The plurality of cross members 4 is provided to have a predetermined distance therebetween in the vehicle front-back direction.

On such a ladder frame 3, a motor 6 as a power source, a gearbox 8, a differential device 12, and drive shafts 14 are provided. The gearbox 8 is coupled to the motor 6. The differential device 12 is coupled to the gearbox 8. The drive shaft 14 is coupled to the differential device 12 via flexible joints 30. An output from the motor 6 is decelerated by the gearbox 8 and then transferred to the differential device 12. The differential device 12 transfers the power, transferred from the gearbox 8, to right and left wheels 16 at a predetermined ratio via the drive shafts 14, which achieves the travel of the electric truck 1.

Note that the present embodiment will describe an example of the electric truck 1 that has the motor 6 only as a traveling power source for driving the rear wheels. Alternatively, for example, the present embodiment can be also applied to a hybrid electric truck 1, in the same manner, which is capable of driving the front wheels by the engine that generates power while consuming fossil-fuel and which also includes a motor 6 for driving the rear wheels, unless otherwise specified.

The motor 6 generates power by being driven with electric power, supplied from the battery (not shown) mounted in the electric truck 1. The battery previously stores DC power, which is converted into AC power having a predetermined frequency by an inverter. The AC power is supplied to the motor 6. In FIG. 1, the battery and the inverter are omitted.

The rotary shaft of the motor 6 is coupled to an input side of the gearbox 8. The gearbox 8 is a deceleration mechanism that includes a plurality of gears. As shown in FIG. 2, the gearbox 8 includes five gears 8a, 8b, 8c, 8d, and Se from the input side to the output side. Among these gears, the gears 8b and 8c are provided coaxially, and likewise the gears 8d and Se are provided coaxially, while the gears 8a and 8b are engaged with each other, and likewise the gears 8c and 8d are engaged with each other. The diameter of each gear is set to enable achievement of a reduction ratio required for the gearbox 8. The gearbox 8 can be configured to convert a high-rotational-speed low torque, input from the side of the motor 6, into a low-rotational-speed high torque by deceleration and then to output the low-rotational-speed high torque.

The output decelerated in the gearbox 8 is input to the differential device 12 provided on the downstream side. A helical gear 13 is provided at the input side of the differential device 12. The helical gear 13 engages with the last gear Se of the gearbox 8. The helical gear 13 receives an input from the last gear 8e of the gearbox 8 and distributes the power, transferred through a pair of left and right output shafts, to left and right drive shafts 14 at a predetermined ratio via differential pinions 9a and side gears 9b. In this way, the output from the motor 6, decelerated by the gearbox 8, is directly input to the differential device 12 without involvement of the propeller shaft 10 (see FIG. 5). Thus, the good power transmission efficiency can be obtained without any transmission loss by the propeller shaft 10. By eliminating the elongated member, such as the propeller shaft 10, the powertrain system can be achieved with a compact structure, thereby making it possible to efficiently ensure a space for mounting other components, for example, a battery for storing electric power supplied to the motor 6.

Note that the structures of components of the differential device 12, excluding the helical gear 13, are based on the known example, and thus the details thereof will be omitted hereinafter.

The differential device 12 transfers the power input from the side of the gearbox 8 to the pair of right and left drive shafts 14 in accordance with the traveling state of the electric truck 1. Each drive shaft 14 has, on both ends thereof, flexible joints 30 covered with boots. The differential device 12 is rotatably coupled to the pair of right and left drive shafts 14 via one of the flexible joints 30 of each drive shaft. Thus, the driving unit 15 can be separated from a support under a spring, and additionally, a road surface input, which is input from the side of the wheel 16, is relieved by the flexible joints 30, so that vibrations transferred to the differential device 12 can be reduced. Then, the power input from the differential device 12 to the drive shafts 14 is transferred to the right and left wheels 16, each coupled to the corresponding drive shaft 14 via the other of the flexible joints 30, which achieves the travel of the electric truck 1.

Here, the motor 6, the gearbox 8, and the differential device 12 are integrally configured as the driving unit 15. In particular, the commercial vehicles, such as truck vehicles, need to output a large traveling power to the wheels 16. For this reason, to obtain adequate reliability, the motor 6, the gearbox 8, and the differential device 12 become large. Consequently, the entire driving unit 15 tends to be large in size. Passenger vehicles are generally configured such that the output from the motor is input directly to the differential device without involvement of the gearbox because even the relatively small driving torque is adequate. Meanwhile, commercial vehicles need the gearbox 8 in order to attain a large driving torque. In this regards, the driving unit 15 in the commercial vehicle tends to be large in size. Such a driving unit 15 is supported by a support part to be described later, with respect to the ladder frame 3.

Here, a support structure of the driving unit 15 onto the ladder frame 3 will be described with reference to FIG. 4, in addition to FIGS. 1 to 3 described above. FIG. 4 is a planar cross-sectional view passing through the drive shafts 14 of the driving unit 15 shown in FIG. 1.

As shown in FIG. 1, in this embodiment, a first support part 22 and a second support part 24 are provided as a support structure for supporting the driving unit 15 with respect to the ladder frame 3.

The first support part 22 supports the driving unit 15 onto the ladder frame 3, while the second support part 24 elastically supports hollow members 19 (see FIG. 3) that supports the drive shafts 14, with respect to the ladder frame 3.

A specific structure of the first support part 22 is not particularly limited as long as the first support part 22 can support the driving unit 15 onto the ladder frame 3. For example, the driving unit 15 and a frame of the ladder frame 3 may be coupled together. Alternatively, the driving unit 15 and a cross member of the ladder frame 3 may be coupled together. In this embodiment, the first support part supports the driving unit 15 with respect to the cross member 4, positioned in the vicinity of the front part of the driving unit 15.

The first support part 22 may elastically support at least a part of the driving unit 15 with respect to the ladder frame 3. Here, the elasticity of the first support part 22 is configured, for example, as a rubber mount.

The second support part 24 elastically supports the pair of hollow members 19 connected together by a coupling member 21, with respect to the ladder frame 3. Such elastic support by the second support part 24 may be configured, for example, by mounting the hollow members 19 onto leaf springs 20a that configure the leaf spring suspension device 20. The pair of leaf springs 20a is provided on the right and left sides to correspond to the pair of wheels 16. On the leaf springs, the pair of hollow members 19 connected together by the coupling member 21 is respectively mounted.

Note that in the present embodiment, an example has been described in which the hollow members 19 are mounted from the upper side with respect to the leaf springs. However, the hollow members 19 may be mounted from the lower side with respect to the leaf springs. Further, in the present embodiment, an example has been described in which the leaf spring type suspension device is applied to the vehicle. However, instead of this, various types of known suspension devices may be used.

As shown in FIG. 2, each drive shaft 14 has, on both ends thereof, the flexible joints 30 covered with the boots. One of the flexible joints 30 is coupled to the differential device 12, while the other flexible joint 30 is coupled to the drive shaft coupled to the wheel 16. With this configuration, even when a relative displacement occurs between the driving unit 15 supported above the spring and the wheel 16 supported under the spring, the power from the driving unit 15 can be transferred to the wheels 16 via the drive shafts 14 rotatably coupled by the flexible joints 30.

With this kind of drive shafts 14, vibrations generated on the sides of the wheels 16 during traveling are absorbed by the flexible joints 30, thereby making it possible to prevent the vibrations from being input directly to the driving unit 15. Consequently, the failure risk of the driving unit 15 can be reduced.

The drive shafts 14 connected to the output sides of the differential device 12 are accommodated in the hollow members (saddles) 19 that are disposed to cover the outer peripheral sides of the drive shafts. Each hollow member 19 has a space into which the drive shaft 14 is insertable. The hollow member 19 rotatably and swingably supports, by a bearing or the like, the drive shaft (not shown) on the side of each wheel coupled to the corresponding drive shaft 14 in the space.

Such hollow members 19 are elastically supported with respect to the side rails 2 via the leaf springs 20a. Further, the hollow members 19 are connected to each other via the coupling member (axle gear) 21 on the rear side of the vehicle, which configures the so-called de Dion rigid axle.

As mentioned above, according to the present embodiment, the motor 6, the gearbox 8, and the differential device 12 are integrally configured as the driving unit 15. Thus, the output from the motor 6 is transferred to the differential device without involvement of any elongated member, such as the propeller shaft, thereby enabling the power transfer with little loss of power. Consequently, the power transmission efficiency is improved, and thereby the adequate fuel efficiency performance can be obtained. The driving unit 15 does not include any elongated member, such as the propeller shaft, so that the powertrain structure can be made compact. Thus, the space for mounting other components, such as the battery, can be efficiently ensured when mounting the components on the vehicle.

However, suppose that the driving unit 15 in which the motor 6, the gearbox 8, and the differential device 12 are integrally configured is adopted for the purpose of improving the mountability of the battery, while achieving the adequate fuel efficiency performance by improving the power transmission efficiency. In such a case, especially, in heavy vehicles, such as trucks, unlike passenger vehicles, it is necessary to transfer the power from the motor 6 to the differential device 12 via the gearbox 8 in order to obtain the sufficient motor torque, which might lead to an increase in the weight of the driving unit 15 itself, increasing the unsprung weight. Furthermore, when adopting a rigid axle in a housing of a heavy vehicle, such as a truck, the unsprung weight might be further increased.

In contrast, in the driving device for an electric truck according to the present embodiment, the differential device 12 of the driving unit 15 is coupled to the drive shafts 14 via the flexible joints 30, and the driving device for an electric truck includes the hollow members 19 that accommodate therein the drive shafts 14 and the coupling member 21 that couples and supports the pair of wheels 16 by coupling the hollow members 19 together. The driving device further includes the first support part 22 that supports the driving unit 15 with respect to the ladder frame and the second support part 24 that elastically supports the hollow members 19 with respect to the ladder frame.

With such a configuration, the driving unit 15 including the motor 6, the gearbox 8, and the differential device 12 is supported onto the ladder frame 3 by the first support part 22, which enables the support above the spring. On the downstream side of the differential device 12, the drive shafts 14 coupled to the wheels 16 and the saddles 19 as the pair of hollow members for accommodating therein the drive shafts are coupled to one another by the coupling member 21 which is an axle pipe, thereby configuring the so-called de Dion rigid axle.

Thus, in the electric truck according to the present embodiment, an increase in the unsprung weight can be prevented even when adopting, in the electric truck, the driving unit 15 in which the motor 6, the gearbox 8, and the differential device 12 are integrally configured and which would otherwise lead to an increase in the unsprung weight.

In this way, the driving device for an electric truck is provided which can obtain good ride quality by decreasing the unsprung weight while achieving the adequate fuel efficiency performance by improving the power transmission efficiency and which can improve the mountability of a battery.

Note that although the present embodiment has described an example in which the electric truck 1 is a vehicle with one rear axle, alternatively, for a vehicle with two rear axles, a trunnion suspension, a four back air suspension, or a Reyco suspension may also be used as the suspension device 20. Although the present embodiment has described an example of the so-called one-differential electric truck 1, including the single differential device 12, the same technical ideas as those in the present application can also apply to a vehicle system that includes a plurality of differential devices 12, such as a two-differential electric truck.

The present disclosure can be applied to driving devices for electric trucks capable of traveling by transferring a driving force of a motor to wheels.

What is claimed is:

1. A driving device for an electric truck that includes a ladder frame on which a cab is mounted, the ladder frame extending along a front-back direction of the electric truck, comprising:
    a driving unit that accommodates therein a motor serving as a power source, a gearbox coupled to the motor, and a differential device coupled to the gearbox;
    a pair of drive shafts coupled to the differential device of the driving unit via flexible joints, the pair of drive shafts configured to transfer power generated by the motor to wheels of the electric truck;
    a pair of hollow members for accommodating therein the pair of drive shafts;
    a coupling member for supporting the wheels by coupling the pair of hollow members together;
    a first support part, wherein the first support part supports the driving unit with respect to the ladder frame; and
    a second support part, wherein the second support part elastically supports the pair of hollow members with respect to the ladder frame.

2. The driving device according to claim 1, wherein the first support part is configured to support the driving unit with lower elasticity than the second support part.

3. The driving device according to claim 1, wherein the second support part is configured to elastically support the pair of hollow members with respect to the ladder frame via leaf springs.

4. The driving device according to claim 1, wherein the differential device includes a helical gear to engage with a last gear of the gearbox.

\* \* \* \* \*